Aug. 20, 1968     O. SCHROEDER     3,397,564
EXPANDING PIPES
Filed Sept. 13, 1965     6 Sheets-Sheet 1
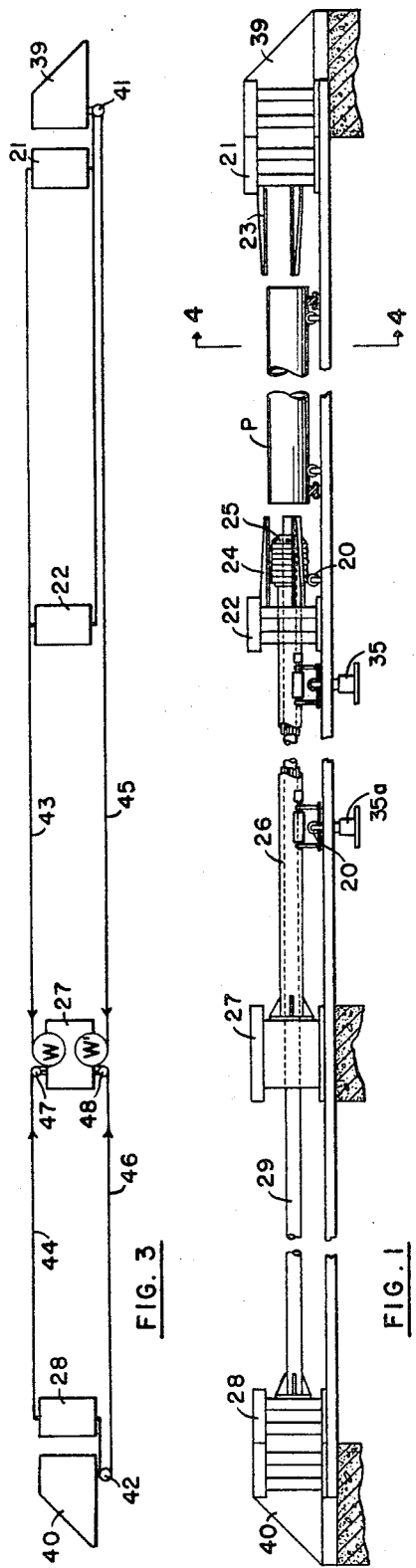
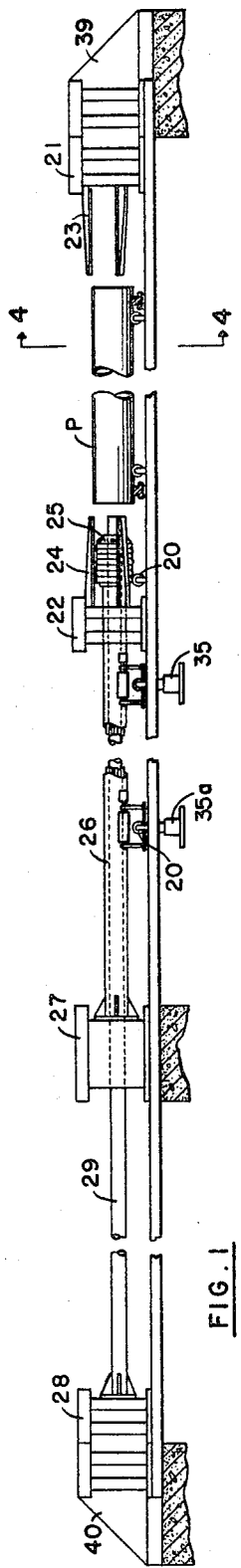
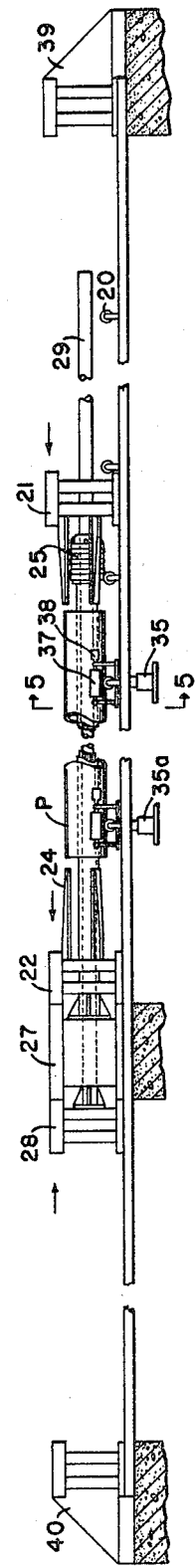
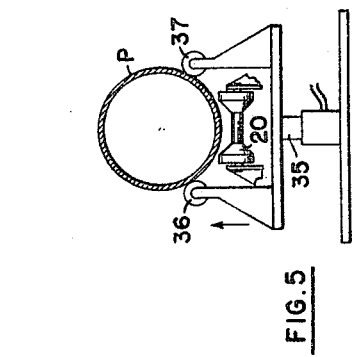
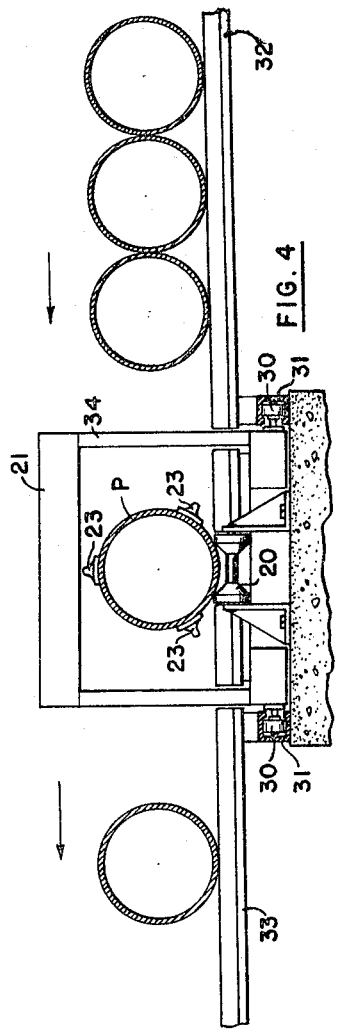

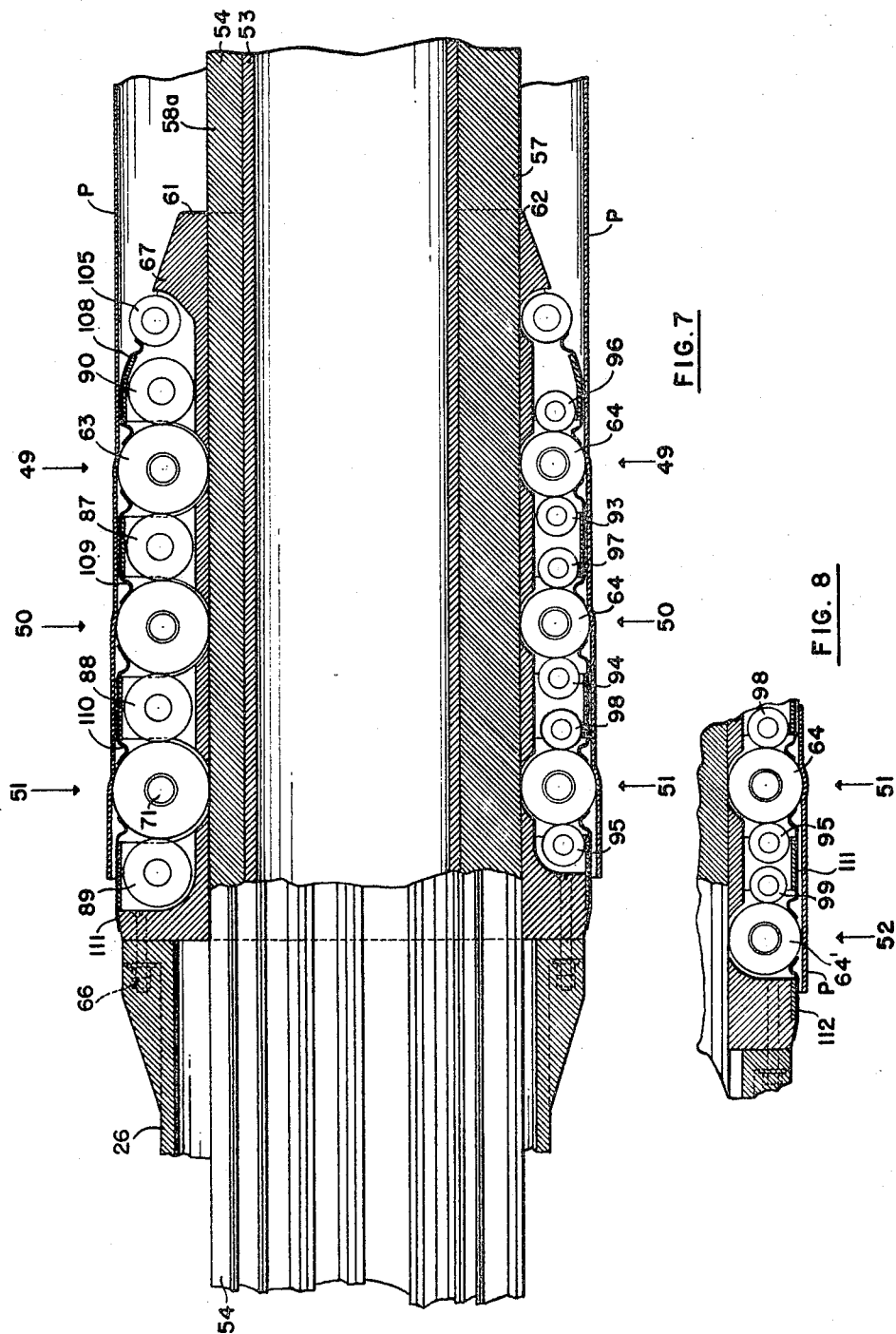

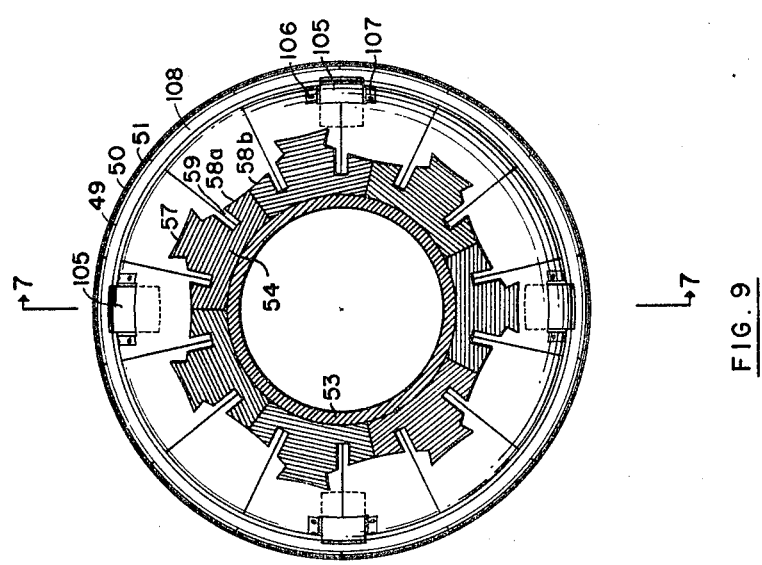

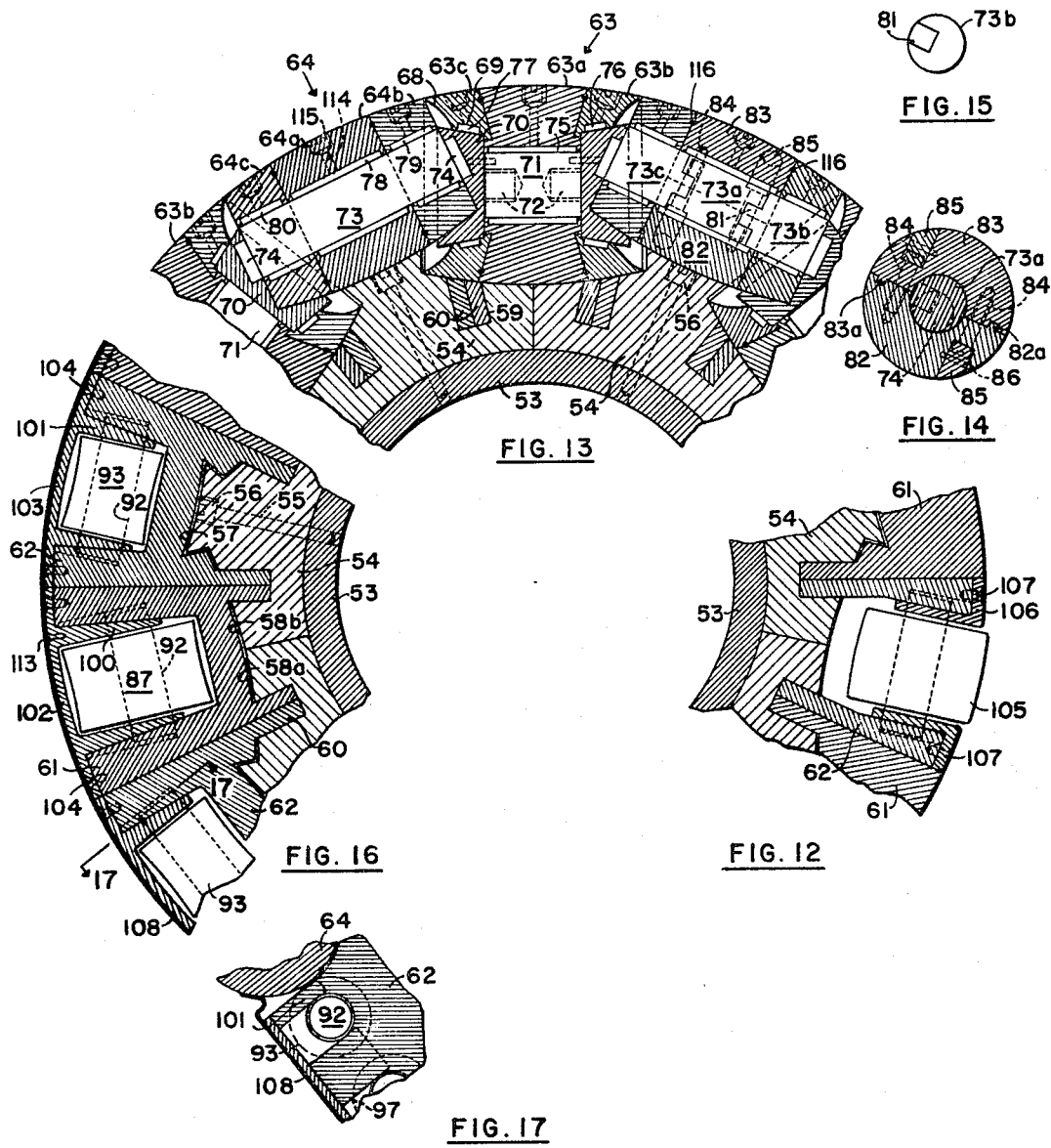

3,397,564
EXPANDING PIPES
Otto Schroeder, 1801 1st St., Napa, Calif. 94558
Filed Sept. 13, 1965, Ser. No. 486,750
41 Claims. (Cl. 72—113)

ABSTRACT OF THE DISCLOSURE

Pipe is expanded by moving longitudinally therethrough an expansion head having one or more rings of expansion rollers with convex outer surfaces and mounted on axes positioned at right angles to and offset outwardly from the central longitudinal axis for engaging the pipe. The ring of expansion rollers includes, in circumferential alternation, rollers of different diameters, the ends of the smaller rollers being partly nested within hollowed ends of the larger rollers to provide a substantially continuous circumferential expanding surface. Means, such as a central mandrel which engaged the inner faces of some expansion rollers, and/or a frame formed from journal axles for the rollers, resists inward movements of the rollers. Each expansion roller can comprise separately rotatable sections on a common axis for rotations at different angular speeds depending on the diameters of the sections. A ring of burnishing rollers at the rear end of the head limits elastic contraction of the expanded pipe and facilitates re-entry of the head into the pipe after withdrawal at the far end. Smaller buffer rollers transmit longitudinal stress to the expansion rollers and prevent their radially outward movement.

The invention relates to a method and to an apparatus for expanding pipes, especially pipes of large diameters, such as steel pipes of 10 to 60 inches internal diameter and having wall thicknesses from ¼ to 1¼ inches.

Pipes of various structural materials, such as steel pipe formed by bending steel plates into circular form and welding the opposed longitudinal edges, have usually heretofore been manufactured to conform to predetermined or specified external dimensions. Such pipes do not have identical internal diameters due, for example, to variations in the wall thickness, as well as due to tolerances in external diameters necessary in commercial operations. Also, often such pipes were not truly circular in cross section. Recently it has become necessary to produce pipes having more exact internal diameters than those heretofore produced, e.g., to reduce the pressure drop along a pipeline that conducts liquid caused by changes in the cross sections of the flow channels defined by terminally conjoined (usually welded) pipe sections of non-uniform internal diameters. These changes in the dimensions of the flow channel create turbulence and consume energy. Pressure drop is also caused by conjoined pipe sections that are slightly out of round and differently oriented. The said pipe sections are commonly called pipe lengths.

Pipes can be expanded to prescribed internal cross sections, both as regards diameters and roundness, by pushing through the pipes an expansion head that moves either in frictional contact with the inner surface of the pipe or has rollers that engage the said surface. However, prior methods and devices for expanding pipes have had important drawbacks. Those involving sliding frictional contact between the expansion head and the pipe have required much power; and those using rolling elements such as balls or rollers, employed circumferentially spaced pipe-engaging elements that did not expand the pipe all around a circle but, instead, expanded selected longitudinal strips of the pipe. Even when such elements are followed by a subsequent circle of engaging elements (spaced longitudinally from the first) and situated in the gaps in the first circle, there remain irregularities in the internal surface of the expanded pipe, such as wrinkles or longitudinal markings. These often cannot be feasibly erased by subsequent roller action. For example, the expansion device described in U.S. Patent No. 1,016,587, employs two axially spaced partial rings of circumferentially spaced rollers, each ring being displaced circumferentially from the other; however, the first ring of rollers to expand the pipe causes longitudinal wrinkles or deformations that are not fully smoothed out by the second ring, and the expanded pipe retains longitudinal marks.

Also, prior expansion heads that used expansion balls or rollers created the radially outward expansion thrust by contact between the rotatable element and the expansion head. This results in high frictional losses and wear, leading to inexact internal pipe dimensions, unless continual attention is paid to lubrication. It is, according to this invention, made possible to avoid reliance on the expansion head for providing the outward forces for opposing the reactive forces of the pipe being expanded, and to create said outward forces, instead, by a mandrel on which the expansion elements roll.

Further, it was found that a pipe made of low-ductility material is often advantageously expanded in a succession of steps. For example, if a pipe is to be expanded by a total amount of 1.5% of its initial mean diameter, it is preferable to expand it in a plurality of steps, such as three, in which each step enlarges the diameter by a smaller incremental amount. This permits compensation for elastic springback of the expanded pipe and eliminates or reduces detrimental effects, such as cracking the material of which the pipe is formed.

Finally, the plant or composite machine for expanding pipes by pushing the expansion head into the pipe was, according to known constructions, inconvenient and involved numerous operations, such moving either the pipe section or the expansion head back and forth in a sequence of steps for localized expansion of the pipe in a succession of zones; this leads to uneven longitudinal and peripheral expansion and to detrimental work-hardening of the pipe.

Now according to this invention, there is provided a method and apparatus for expanding pipe in which the outward forces acting on the internal surface of the pipe for expanding it are generated by essentially rolling action between a central mandrel and rollers that engage the said internal pipe surface of the pipe. By such a rolling action the axial force applied to push the expansion head through the pipe is greatly reduced.

Further, according to another feature, the invention provides a ring of expansion rollers, each curved convexly to conform substantially to the internal surface of the expanded pipe, that present a substantially continuous expanding surface about the internal circumference of the pipe. Thereby creases or marks on the pipe are obviated, because the pipe is expanded simultaneously all about a given circumference. Thus a single ring or any desired number of such rings of rollers can be provided, and expansion occurs simultaneously all about each ring. Whether one or a series of rings is used, each expanding thrust progresses continuously along the length of the pipe.

In a preferred embodiment of the invention the ring of expansion rollers which includes a substantially full circle of outer pipe-engaging surfaces is formed by mounting, within said circle, two or more sets of expansion rollers of different diameters. In one example, said circle includes two sets of expansion rollers of different outer diameters mounted in circumferential alternation with the larger rollers recessed at their ends to receive the end parts of the smaller rollers, which rotate on central axes disposed angularly with respect to the axes of rotation of the larger rollers. All rollers have convex outer surfaces conforming to the respective internal contours of the inner surface of the pipe during and at the completion of the expanding process.

The said circle of expansion rollers is assembled to the expansion head by emplacing the expansion rollers of different diameters within a circumferential outer recess in the head. To insert the last roller of the circle of rollers (either a large or small diameter roller), it is necessary in the illustrative embodiment to be described to insert said last roller as two separate roller segments each providing a part of the roller surface, e.g., separated along the axis of rotation of the said last roller. When a journal pin is used it includes several, e.g., three axially juxtaposed sections, installed in succession. After the segments of the roller (and the sections of the journal pin if used) are emplaced, the roller segments are interconnected by suitable means such as screws to form a rigid unitary structure.

For the purpose of retaining and positioning the said sets of expansion rollers of different diameters and turning on angularly related axes, support blocks are, in the preferred construction, situated principally within the above mentioned recesses in the ends of the larger rollers. The said support blocks provide journal means for the axially juxtaposed rollers, and because each journal means is angularly related to that of the juxtaposed journal means, the said bearing blocks are constrained against rotation.

According to another feature of the invention, the pipe is expanded in a sequence of steps. To this end, the expansion head includes a plurality of two or more rings of expansion rollers, each of said rings preferably presenting and providing a substantially continuous outer expansion surface of contact with pipe, e.g., of circular shape, and each of said outer surfaces having an outer contacting diameter larger than that of the ring of expansion rollers toward the lead end of the expansion head. For example, each of said circle of rollers has an external diameter about 0.2% to 0.8% larger than the mean diameter of the pipe (i.e., for each circle that follows a prior circle of rollers, a corresponding greater diameter). In other words, the circle enclosing the convex outer surfaces of the several expansion rollers in each ring has a diameter greater than the diameter of the preceding ring of rollers. Thereby the pipe is expanded in successive steps, and each ring of expansion rollers enlarges the pipe simultaneously about its circumference. The said rings acting simultaneously, thereby avoiding the formation of longitudinal creases, grooves or marks that are regarded as irregularities.

In rear of the single ring or series of rings of expansion rollers of progressively greater sizes, there may be provided one or more rings of burnishing rollers, preferably also presenting a substantially continuous outer pipe-engaging surface, having an outline slightly smaller than the next forward ring of expansion rollers. The burnishing rollers perform two functions: During the forward movement of the expansion head through the pipe, they limit the elastic contraction of the pipe and aid in shaping the pipe to the desired diameter and true cross section, e.g., circularity. Further, when the expansion head reenters the expanded pipe to retract the head, they assist the entry of the head into the pipe, which often has a diameter slightly less than the diameter of the last ring of expansion rollers due to elastic spring-back of the pipe.

For retaining the said one or several axially displaced circular sets of expansion rollers within the expansion head, a buffer roller engages each of said expansion rollers at the side away from the leading end of the head, mounted for rotation on said head on rotation axes radially more distant from the central axis of the head than the respective expansion rollers. The buffer rollers thereby impart a constraint on the expansion rollers and thereby retain the expansion rollers to the head.

Moreover, the said buffer rollers transmit axial thrust (along the longitudinal axis of the expansion head) from the expansion rollers to the head, regardless of whether the buffer rollers are situated with their axes of rotation outwardly as described in the preceding paragraph.

Preferably, two or more sizes of buffer rollers, corresponding to the expansion rollers, are provided. The buffer rollers that engage the large-diameter expansion rollers are also of large external diameters and (except for those at the ends of the series of circles of expansion rollers) engage two large-diameter expansion rollers. In contrast, the buffer rollers that engage the small-diameter expansion rollers have smaller external diameters, and each small buffer roller engages but one small-diameter expansion roller. In the case of both or all sizes of buffer rollers, there is preferably a buffer roller situated on the side of the foremost circle of expansion rollers toward the leading end of the expansion head and journalled on an axis radially outward from the engaged expansion roller for insuring retention of the expansion rollers on the head.

The expansion head is, in the preferred construction, formed to permit at least some and, preferably, all of the expansion rollers to project radially inwardly, and to provide a central, longitudinal passage for receiving a mandrel that is shaped to engage the radially inwardly projecting parts of the expansion rollers, to maintain the expansion rollers in their outer position while expanding a pipe. Thereby all of the radial outward thrust of the expansion rollers originates in the said mandrel. When, as in the preferred embodiment to be described, a ring of expansion rollers of different diameters is assembled to present a full pipe-expanding circle about the head, the mandrel preferably has longitudinally extended portions situated at different radii from the central axis of the mandrel for rolling engagement respectively with the rollers of different radii, said mandrel portions being preferably concave in cross section to engage the outer convex surfaces of the expansion rollers. A similar rolling engagement exists between the mandrel surfaces and the burnishing rollers, when the latter are provided.

In a specific construction, the working part of the mandrel (which moves through the expansion head) is formed of a plurality of longitudinally elongated sectors, e.g., equal in number to the number of expansion rollers of large diameter in the circle, each said sector having radially extended and radially recessed portions, for rolling engagement respectively with the small and large expansion rollers, the said sectors being mounted in supporting relation on the outer face of an inner supporting pipe and fastened thereto by radial attachment screws.

It will be understood that the preferred construction is not essential to the invention, and that only the large-diameter expansion rollers need engage the mandrel; in this case the small-diameter rollers are held radially outward against the pipe by the mandrel through their journals, which are secured via support blocks (previously mentioned) and the large-diameter rollers.

Because the expansion rollers are curved convexly to engage the inner surface of the pipe, portions of the said rollers having different external diameters will not roll at the same rates of rotation when moved against the pipe (or against the mandrel). To minimize the number of expansion rollers required in any one ring, it is advantageous to form each expansion roller from a plurality of relatively rotatable, axially adjacent sections, so that the two or more outer roller sections (at the ends of the common axis of rotation and, hence, having smaller mean outer diameters) can rotate more rapidly than the central section or sections, albeit that the difference in speed is slight. When the expansion roller is thus formed of a plurality of axially displaced sections, a common journal pin or axle is provided, and said sections preferably rotate on said pin while expanding the pipe. In a specific embodiment, all roller sections are provided with anti-friction means, such as races of roller needles or pins, and the common journal pin or axle is fixed to the stationary support blocks described above.

Further, in the construction to be described, some of the elongated sectors of the mandrel engage only the central roller section of each roller that includes such a plurality of sections, and the outward expansion force from the mandrel resisting inward movement of the outer roller sections is transmitted via the engaged central section and the journal pin or axle to the other sections. For this reason the journal pin or axle must have sufficient structural rigidity to transmit the forces developed in the pipe-expanding operation.

The rollers are preferably provided with means for admitting lubricant under pressure, e.g., from the interior of the head or through passages formed in the rollers. The latter are advantageously closed by plugs that have convex outer surfaces in conformity with the exterior shapes of the rollers.

Moreover, a shield or a series of separate shields preferably encircle the head and engage the expansion rollers to wipe them and prevent the entry into the circumferential head recess or recesses which contain the expansion rollers of scale from the pipe or other objects. Further, such shields continuously wipe the expansion rollers to remove scale or debris collected on the rollers, and thereby facilitates a more exact expansion of the pipe by each circle of rollers to the predetermined diameter.

The said shield encircles the buffer rollers and, when a series of axially spaced expansion rollers is provided, there is provided a series of such shields, each preferably being in wiping engagement with two circles of expansion rollers.

A flushing fluid, which may have lubricating properties, can be injected into the interior of the head to surround the rollers and move outwards between the rollers and shield to carry out any scale or debris and prevent entry thereof into the head. To this end a supply duct can be connected to the head and attached to a source from which the fluid is injected continuously or intermittently.

The composite apparatus or plant for employing the said expansion head and mandrel may comprise abutment members that are power driven to move toward each other and are respectively adapted to engage the end of the pipe remote from the expansion head and the said mandrel. Further, said apparatus includes an arbor that bears against a stationary abutment and against the end of the expansion head away from the initial position of the pipe for maintaining the head in a stationary position as the pipe and mandrel move in opposite directions. The said arbor, when provided, has an annular shape of external diameter to move freely within said expanded pipe and of internal diameter to receive the said mandrel in axially slidable relation in or out of contact therewith. Moreover, in a specific embodiment, means are provided for pulling the said mandrel and the expanded pipe apart after completion of the expanding operation; these means may include cables secured to the said movable abutment members and connected to power drive means.

For feeding the initial pipe to its initial position in axial alignment with the expansion head, and for moving the expanded pipe away from said position (in which it is situated after the expanded pipe and mandrel are pulled apart), there is provided a conveying mechanism for feeding the initial pipe transversely to its axis onto a bed on which the pipe is in axial alignment with the expansion head and the mandrel, and for discharging the expanded pipe transversely to its axis from said bed in the same direction as before.

The said mandrel advantageously engages the inner faces of the rollers of the expansion head at all times during the previous operations. It is evident that the mandrel must have a total length at least twice that of the pipe to be expanded; however, only about 55% of its length need have roller-engaging or working surfaces, the remaining 45% being only for supporting the mandrel by extending through the pipe.

Certain embodiments of the invention are described with reference to the accompanying drawings forming a part of this specification, wherein:

FIGURE 1 is an elevation of the pipe expansion plant, showing the parts positioned prior to expansion of the pipe;

FIGURE 2 is an elevation corresponding to FIGURE 1 but showing the parts after the pipe has been expanded and moved axially beyond the expansion head and raised by its elevators;

FIGURE 3 is a schematic diagram illustrating a possible arrangement of cables for moving the abutments;

FIGURES 4 and 5 are transverse sectional views, taken on the lines 4—4 and 5—5, respectively, of FIGURES 1 and 2, respectively on an enlarged scale.

Figure 6:
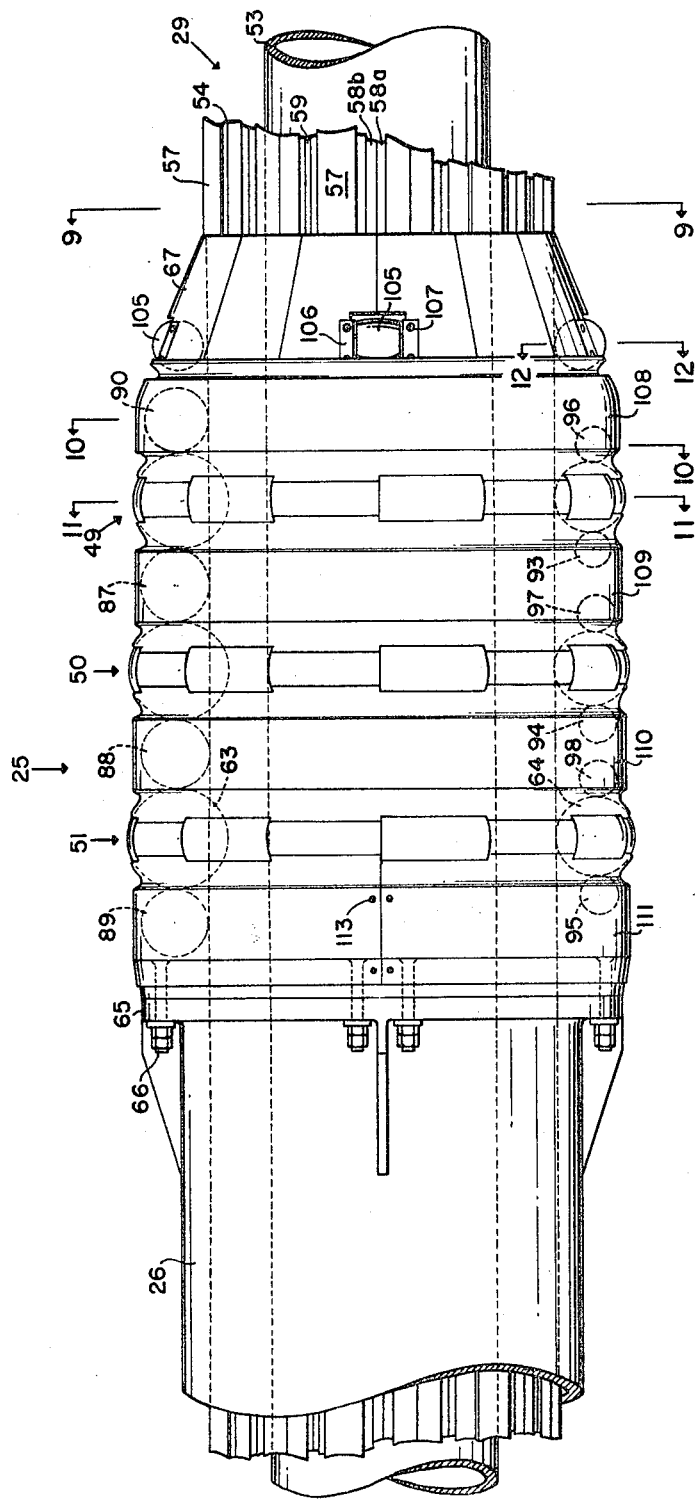
Figure 10:
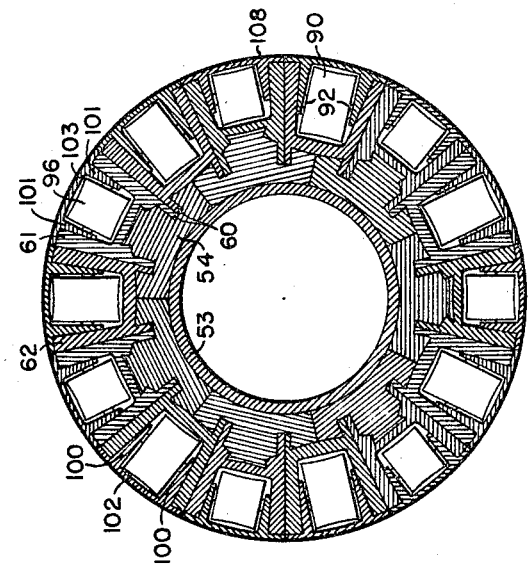
Figure 11:
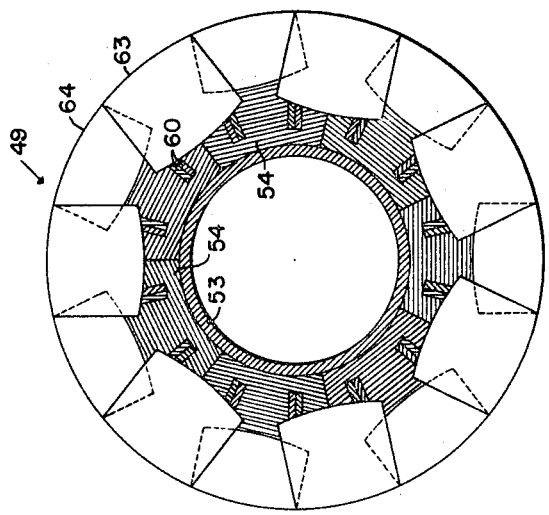

FIGURE 6 is an elevation of the expansion head and parts of the mandrel, enlarged relatively to FIGURE 1;

FIGURE 7 is a longitudinal sectional view corresponding to FIGURE 6, taken on the line 7—7 of FIGURE 9 and showing the pipe being expanded;

FIGURE 8 is a view of a part of FIGURE 7 showing a modified embodiment providing a ring of burnishing rollers;

FIGURES 9, 10, and 11 are transverse sectional views taken on the lines 9—9, 10—10 and 11—11, respectively, of FIGURE 6, the line 10—10 being broken to extend through the several buffer rollers (shown in elevation), which lie in different transverse planes;

FIGURE 12 is an enlarged fragmentary sectional view on the line 12—12 of FIGURE 6, showing a guide roller which appears in elevation;

FIGURE 13 is a fragmentary transverse sectional view on an enlarged scale showing a sector of the expansion head and its expansion rollers;

FIGURE 14 is a sectional view taken on a plane perpendicular to the axis of rotation of the central section of a small expansion roller, showing the special construction used for installing the last roller in a circle;

FIGURE 15 is an end view of the journal section 73*b* of FIGURE 13;

FIGURE 16 is an enlarged fragmentary transverse sectional view through the expansion head, taken on a broken section line passing through both the large-diameter and the small-diameter buffer rollers, which appear in elevation, although the latter are longitudinally displaced from the former, looking toward the front end of the head; and FIGURE 17 is a fragmentary sectional view taken on line 17—17 of FIGURE 16.

Referring to FIGURES 1, 2 and 4, the composite pipe-expanding machine includes: an elongated bed for supporting and permitting longitudinal movement of a pipe P, said bed comprising a longitudinal row of pipe-supporting, concave rollers 20; a pair of pipe-moving, movable abutments 21, 22, each having projecting therefrom pipe-abutting elements, such as three arms 23, 24, attached to the abutments and positioned to engage the ends of the pipe P, the ends of these arms being preferably provided with faces to engage the pipe ends and movable outward from the central pipe axis, by resilient bending of the arms or by any other suitable construction; a pipe expansion head 25 having expansion rollers to be described and maintained in a stationary position by a supporting arbor 26 of external diameter to fit with clearance into the pipe P, said arbor being supportedly fixed to a stationary abutment 27; a movable abutment 28; and a mandrel 29 that is supportedly fixed on the abutment 28 and extends through the arbor 26 and into the expansion head 25, extending preferably through the latter as appears in FIGURE 1. When the parts are in the positions shown in FIGURE 2 the mandrel 29 projects through the head 25 for a distance about equal to the length of the pipe.

The movable abutments 21, 22 and 28 are supported through rollers 30 by channel-shaped tracks 31. The abutting elements 23, 24, have lengths in excess of the length of the expansion head 25 and are spread apart to permit movement onto at least the ends of the head 25, and to pass fully along the sides of the head, if necessary, by outward deflection. To insure engagement with the pipe ends, the outer abutting ends of the elements 23, 24 may be normally closer together than the greatest external diameter of the head but capable of outward resilient separation. These outer ends of the elements 23 are spaced apart longitudinally from the ends of the elements 24 by a distance somewhat greater than the length of the pipe P, to accommodate pipes of varying lengths.

For feeding the pipe P onto the bed 20 and for discharging the expanded pipe therefrom, there are provided transverse feed stringers 32 and discharge stringers 33, which may be inclined to permit pipes to roll thereon by gravity. As appears in FIGURE 4, these stringers are interrupted to permit passage of the posts 34 of the movable abutment 21. Suitable means for stopping new pipes on the bed of rollers 20 and for initiating movement of the expanded pipes from the rollers 20 onto the discharge stringers 33 are provided but, being known to the art and not a part of this invention, are not further described.

Optionally, the machine is provided with suitable means for rotating the pipe, after being expanded and assuming the position shown in FIGURE 2, through a small angle, such as 10–15°, about its central axis. An example of suitable means, shown in FIGURES 1, 2 and 5, includes longitudinally spaced elevators 35, 35a, each having an idler roller 36 and a drive roller 37, both mounted for rotation on laterally spaced, longitudinal axes, the rollers 37 being coupled to rotary power means, such as an electric motor 38. The actuating mechanism provides for raising the two elevators in unison to lift the pipe P off the rollers 20 or to support the pipe just sufficiently to permit rotation of the pipe, energize the motors 38 to turn the pipe through a small, predetermined angle, and retract the elevators. The control mechanism for effecting this sequence of operations will be apparent to those skilled in the art and is, therefore, not further described.

Any suitable mechanism, such as screws, hydraulic rams, or cables, may be provided for moving the abutments 21 and 22 in unison between the positions of FIGURE 1 and FIGURE 2; preferably, such mechanism simultaneously drives the abutment 28 at the same speed but in the opposite direction. (It is possible to omit drive means for the abutment 28, which is then moved by the mandrel 29, the mandrel being urged axially forward and back by frictional engagement with the drive rollers in the expansion as will appear.) FIGURE 3 illustrates schematically one form of mechanism for driving all movable abutments, using tension cables, which are omitted for clarity from the other views. Stationary terminal abutments 39 and 40 are provided longitudinally beyond the extreme positions of the abutments 21 and 28 and carry pulleys 41 and 42. A pair of power-driven wind-up drums W and W' are mounted on the stationary abutment 27 for simultaneous rotation in the same directions. (W and W' may be sections of a common wind-up drum.) A first pair of steel cables 43, 44, are wound on the drum W and a second pair of like cables 45, 46 on the drum W'. Wind-up directions are indicated by arrows on these cables. Pulleys 47 and 48 are secured to the abutment 27. The cable 43 is connected to both movable abutments 21 and 22, and the cable 46 passes from the drum W' about the pulleys 48 and 42 and is connected to the abutment 28. When the drums are rotated in the counter-clockwise direction (as viewed in FIGURE 3) the first pair of cables are wound onto the drum W, thereby pulling the movable abutments from their positions of FIGURE 1 to those of FIGURE 2, the second pair of cables being simultaneously paid out from the drum W'. When the drums are rotated in the clockwise direction the cables 45 and 46 are wound onto the drum W' and pull the movable abutments back to the positions shown in FIGURE 1, the cables 43 and 44 being paid out from the drum W.

To facilitate an understanding of the expansion head and its mandrel, it is desirable to present first a brief outline of their functions. The movable abutments 21, 22 and 28 being in their initial positions shown in FIGURE 1, a new pipe P is moved from the feed stringers 32 onto the rollers 20 and the drums W, W' are turned counterclockwise to move the said abutments to their positions of FIGURE 2. After the clearance between the end of the pipe and the ends of the arms 23 is closed, these arms engage the pipe and push it, while supported on the rollers 20, over the expansion head 25, which head includes one or more rings of expansion rollers to be described. Simultaneously the mandrel 29 moves to the right, through the expansion head, in engagement with the inner faces of the expansion rollers, which engage both the mandrel and the pipe with substantial rolling motion. As will appear, some of these rollers may be burnishing rollers, at the left end of the head. Thereby the mandrel provides the outward force counteracting the radially inward reaction of the pipe being expanded. Due to this rolling motion the mandrel moves axially as fast as the pipe but in the opposite direction relatively to the head 25, which remains stationary.

When the pipe P has been pushed fully over and beyond the expansion head, to the position shown in FIGURE 2, the drums W, W' are reversed. After a small initial movement, the arms 24 engage the lead end of the pipe, pushing it back over the expansion head, and the mandrel moves to the left. The expanded pipe is then discharged from the rollers 20 onto the discharge stringers 33, and the next pipe from the stringers 32 is fed into the rollers 20.

It is to be noted that it is the relative movements among the pipe, the expansion head and the mandrel that are important, and that arrangements other than that using a stationary head are possible, e.g., the pipe can be held stationary and the expansion head and mandrel can be moved toward the pipe with relative velocities in the ratio of 1:2.

Among the important features, preferably but not necessarily used in combination, are: (1) The head has one or more, e.g., three rings of rollers 49, 50 and 51 (FIGURES 6, 11 and 13), each of which presents a peripherally continuous pipe-engaging surface. (2) The pipe is expanded in steps, so that each of said rings of rollers presents an outer contact surface that is slightly larger than that of the preceding ring (FIGURE 7). (3) As appears in FIGURE 8, there is a ring 52 of burnishing rollers following the ring (or the last ring) of expansion rollers having an outer contact surface that is slightly smaller than that of the adjacent or largest ring of expansion rollers. Feature (1) makes it necessary to include in each ring rollers of different diameters. Feature (2) makes it necessary that all rollers of the ring 50 have diameters greater than the corresponding, longitudinally aligned rollers of the ring 49, and that the rollers of the ring 51 have still larger diameters, since all aligned rollers roll on the same portion of the mandrel. Feature (3) makes it necessary for the burnishing rollers 52 to have diameters slightly less than the corresponding, longitudinally aligned rollers of the ring 51.

These important features cause the pipe to be enlarged simultaneously about a substantially full circle by each successive ring of expansion rollers, whereby creases or other marks in the pipe are avoided, and greatly facilitates the step-wise enlargement of the pipe. Given materials of construction for the pipe and the degree of expansion, as well as cold-hardening effects constitute variables which will determine the number of steps (equal to the number of rings of expansion rollers) and the desirability of gradual enlargement of the pipe.

The burnishing rollers 52 are for producing precise internal pipe sizes, assuring that the elastic spring-back after the final expansion rollers 51 will not exceed a predetermined amount, and that the pipe surface will be burnished. Also, the slightly smaller outer diameter of the burnishing rollers facilitates engagement of the pipe onto the expansion head on the return stroke.

Referring to FIGURES 6, 7, 9, 11 and 13, the mandrel 29 may be composite and include a central tube 53 extending from the abutment 28 for the full length of the mandrel, through a distance exceeding twice the length of the pipe P, having affixed to its outside a plurality of longitudinal sectors 54, e.g., equal in number to one-half the number of expansion rollers in each ring; however, this number of sectors is not essential and fewer or more sectors can be used. These sectors, in the illustrative embodiment, extend through about 55% of the length of the tube 53 at the front end of the tube 53, so that parts thereof are situated within the head 25 in all relative positions of the mandrel and head. In this embodiment seven sectors 54 are provided and each ring of rollers includes fourteen rollers. Each sector 54 may include longitudinally juxtaposed sections, which are secured to the tube 53 by radial screws 55 (FIG. 13), situated at longitudinal intervals of about two feet, in threaded engagement with the tube and having enlarged heads 56 positioned within counterbores in the sections. Each sector includes a raised portion (through which the screws 55 extend) forming an outer runway 57 and a pair of shoulders 58a, 58b which, when joined with shoulders on adjacent sectors, form inner mandrel runways. Seven outer runways 57 and seven inner runways are provided.

Both the outer and inner runways are curved concavely in cross section and have substantially the same radius of curvature as the inner engaged surface of the pipe P. It will be noted that when several rings of expansion rollers are used the pipe P does not have a constant engaged diameter; instead, the pipe diameter is progressively enlarged. However, the outer diameter of each ring of expansion rollers exceeds that of the preceding ring by only a small percentage, such as 0.5%, and the difference in the radius of curvature of the pipe at successive sections is therefore small. Because the pipe is expanded to a specified ultimate internal diameter and the internal diameter of the new pipe is often greater than the minimum diameter confining the first ring 49, the radius of curvature of the mandrel runways is preferably equal to the radius of the pipe after expansion by the largest expansion rollers 51, or equal to a radius intermediate said radius and the radius after expansion by the intermediate ring 50.

Effective bearing of the rollers having different diameters is promoted by the fact that only the central portions of the rollers need be in engagement with the mandrel runways. Thus, as will appear, each runway may engage only the central part of an expansion or burnishing roller and/or the rollers may be formed of several segments for independent rotations instead of engaging the runways along the full lengths of unitary rollers.

The mandrel sectors 54 are provided with longitudinal grooves 59 that extend radially for receiving, without binding, longitudinally slidable legs 60 of the expansion head sectors 61 and 62 to be described.

The expansion head 25 will be described first with reference to FIGURES 6, 7, 10, 13 and 16. It is formed of a plurality of longitudinally elongated sectors 61 and 62, arranged circumferentially in alternation, equal in number to the number of expansion (or burnishing) rollers in each ring, i.e., seven sectors 61 for the large-diameter rollers 63 and seven sectors 62 for the small-diameter rollers 64, making a total of fourteen sectors (the reference numbers 63 and 64 denote rollers regardless of the rings that include them). Each sector 61 and 62 extends the full length of the head and includes the said integral radially extending legs 60 that are assembled axially to the grooves 59 on the mandrel and cannot be displaced radially due to the outwardly diverging dispositions of the grooves and legs. Each of the grooves is filled with a pair of legs 60 from two circumferentially juxtaposed sectors. Each sector 61 and 62 is circumferentially continuous at radially inner part as appears in FIGURES 10 and 16, but has openings at both its radially inner and outer portions as appears in FIGURE 13 for receiving the expansion rollers, so that these can engage the mandrel runways 57 or 58a–58b and the pipe. (Each sector may further have recesses for buffer rollers, to be described.) To facilitate continuous engagement of the small rollers 64 with the mandrel runways 57, the heads 56 of the mandrel screws are curved in conformity with the runways 57. The arbor 26 is fixed to the rear end of the head by a flange ring 65 and bolts 66. The front end of the expansion head is tapered to a reduced cross section, as appears at 67, and the rear end is also preferably tapered, as shown.

As appears in FIGURES 11 and 13, the rollers in each ring are arranged with large-diameter rollers 63 and small-diameter rollers 64 in alternation, the axes of rotation of the rollers being in angular relation to form a polygon about the central axis of the head. Each large roller 63 has at each end thereof a recess formed as a surface of revolution about the roller axis the outermost part of which is curved concavely, as shown at 68, and the inner part of 69 of which is frusto-conical. The curved parts 68 receive the ends of adjoining small rollers 64, which lie partly within said end recesses, for independent rotations about their respective axes with the longitudinal extremities of adjacent rollers in close juxtaposition at the outside of the ring of rollers. Because each roller is externally convex with a curvature corresponding to that of the pipe in its expanded shape at the respective ring of rollers, a substantially complete, circular external expansion surface is presented by each ring of expansion rollers. A similar circumferential burnishing surface is presented by the burnishing rollers 52.

The several rollers of each ring are retained in position in part by support blocks 70, one of which is situated principally within the end recess in each large roller 63. The blocks 70 are interconnected by alternating journals 71 for the large rollers 63, the journals 71 being secured to threaded projections 72, integral with the blocks 70 and journals 73 for the small rollers 64. The latter are not threadedly fixed to the blocks but have eccentric heads or stubs 74 that lie within recesses in the blocks 70, e.g., of circular outline. Because the journals 71 and 73 are angularly related the blocks 70 cannot rotate but remain substantially stationary relatively to the expansion head; and because of the eccentric heads 74, the journals 73 cannot rotate about their axes. The large rollers are preferably mounted on the journals 71 by anti-friction means, such as a central, cylindrical nest of roller pins or needles 75 and frusto-conical nests of needles 76 and 77. Similarly, the small rollers are provided with cylindrical nests of roller needles 78, 79, and 80.

Because of the convex curvatures of the outer surfaces of the expansion and burnishing rollers, causing parts at different locations along the axes of rotation to have different diameters, the said parts cannot all roll along the pipe and mandrel runways without some sliding motions. Sliding motions are very small and the resultant frictional forces can be reduced by lubrication; they can be further reduced by forming each expansion roller and, if desired, each burnishing roller, of a plurality of axially displaced segments, e.g., three segments as shown in FIGURE 13. Thus, each large-diameter roller includes a central segment 63a which turns on the needles 75 and end segments 63b, 63c, which turn on the conical needles 76, 77 respectively. Similarly, each small-diameter roller includes a central segment 64a which turns on the needles 78 and end segments 64b, 64c, which turn on the needles 79, 80 respectively. Thereby the three segments of each roller are mounted for independent rotation on the respective journals 71 and 73. The central segments 63a and 64a of all rollers, and, in this embodiment, the end segments 63b, 63c, of the large rollers, engages the longitudinal runways on the mandrel; outwardly directed force is transmitted to the end segments 64b, 64c from the central segment 64a through the journals 73. The embodiment shows an arrangement in which the rollers of one size bear on the mandrel runway through their full lengths (save for bands opposite the legs 60), and those of another size bear on their runways only at their central segments; however, it is obvious that this specific arrangement is merely illustrative. It may be noted that the several segments of each roller are in close axial juxtaposition, so that each composite roller presents a substantially continuous outer surface of curvature to engage the pipe on an arc of a circle.

In assembling the rings of expansion or burnishing rollers to the expansion head, the several sectors 61 and 62 are placed in juxtaposition in a jig that holds them with the legs 60 of juxtaposed sectors in abutment, so as to enter the longitudinal grooves 59 in the mandrel, and the rollers 63 and 64 and the blocks 70 are assembled sequentially. Thus, after each roller 63 with its journal 71, needles and block 70 is installed, a small roller with its journal 73 and needles is installed, fitting the eccentric head 74 into the recess in the previously installed block 70. The last roller in each ring cannot be installed in this manner, and a special construction is used, i.e., including a journal comprising several, such as three, axially joined sections, and a split roller.

Although either a large or small roller can be the last to be installed in each ring, the illustrative embodiment shows the latter. To this end, the small roller shown at the right of FIGURE 13 and in FIGURE 14, has a journal formed of a central section 73a and end sections 73b and 73c, the last two having at their outer ends eccentric heads as previously described for the journals 73. The inner ends of the sections 73b and 73c have end projections 81, as illustrated further in FIGURE 15 for the former, of widths less than the journal diameter and extending radially from one journal surface through about half of its diameter. The central section 73a has a mating groove in each end.

The last small roller has its end segments formed as previously described, and journalled to the journal sections 73b and 73c, respectively. The central roller segment includes two sections 82, 83, of identical shapes, preferably having a longitudinal tongue 82a or 83a, in the face which abuts the corresponding face of the other section, situated at one side of a central, semi-circular journal-receiving recess, and a mating groove at the other side. Holes for inter-connecting the sections by means of screws 84 are provided.

In assembling the last roller to the expansion head, the journal sections 73b and 73c, together with their end roller segments, and their needle rollers, are emplaced by inserting their eccentric heads into the recesses in the previously emplaced blocks 70. The central journal section 73a is then attached by sliding its end grooves onto the projections 81. The section 82 of the roller is then placed about the completed journal, with half of its circle of needle race 78, and is rotated about the journal toward the center of the head. The section 83, with the other half of the needle race, in its semi-circular recess, is then emplaced, and the secitons 82 and 83 are pulled together and secured by the screws 84. These screws have enlarged heads which fit within counterbores in the sections 82, 83 and have screwdriver slots. The counterbores in the sections 82, 83, above the screw heads, are then filled with plugs 85 the outer ends of which are shaped in conformity to the outer surfaces of the roller sections 82, 83. These plugs are secured and prevented from turning by pins 86 that have frictional fits within aligned holes in the roller sections and the plugs.

The expansion head may further include buffer rollers having the dual functions of (1) transmitting longitudinal thrust along the head axis from the expansion rollers (and the burnishing rollers, when used) to the head, and (2) retaining the said rollers against radially outward displacement from the head. These buffer rollers are of two sizes.

As is shown in FIGURES 6 and 7, there is a large-diameter buffer roller 87, 88 or 89 on the rear side of each large-diameter expansion roller (away from the oncoming pipe P being expanded) in each ring of expansion rollers. Additionally, an auxiliary buffer roller 90 of large diameter may be mounted at the front side of each large roller 63 of the first ring 49. When burnishing rollers 52 (FIGURE 8) are provided, an additional large buffer roller may be in rear of each large-diameter burnishing roller. (FIGURE 8 shows only a small-diameter burnishing roller 64', but is formed as described for the expansion rollers with alternating rollers of large and small diameters.) As is shown in FIGURES 10 and 16, these buffer rollers are journalled within radially open recesses formed in the expansion head sectors 61 by journals 92 that may include anti-friction means, not shown. The ends of the journals fit into radial slots formed in the said expansion head sector at the longitudinal ends of the recesses. The axes of the journals 92 are positioned radially outwards from the axes of the journals 71 and the buffer rollers are in engagement with the respectively forwardly positioned expansion (or burnishings) rollers (or their central segments) to engage the latter outwardly from their midsections. The buffer rollers 87–90 may also engage the forward sides of the expansion (and burnishing) rollers; in any case, they are situated sufficiently near the respective rollers of the rings 49–51 (and 52, when provided) to engage the rollers of the said rings with an inward reaction component. The buffer rollers rotate in directions opposite to the rotational direction of the expansion and burnishing rollers.

Each small-diameter expansion roller 64 is also backed by a buffer roller 93, 94 or 95, mounted as described for the rollers 87–90 within recesses in the head sectors 62; however, it is not feasible to provide buffer rollers that will engage the successive small expansion rollers in the embodiment shown. Hence, as appears in FIGURES 6, 7, 16 and 17, an additional ring of small buffer rollers 96, 97 and 98 is provided to engage the forward ends of the small expansion rollers 64. When burnishing rollers are provided, small buffer rollers 99 are similarly mounted in the head in front of each small burnishing roller. The rollers 93–99 have their axes of rotation situated parallel to and radially outwards from the axes of rotation of the journals 73, of adjacent expansion (or burnishing) rollers and the small buffer rollers are in engagement with the respectively adjacent expansion (or burnishing) rollers to retain them against radially outward displacement from the head.

The small buffer rollers 96–99 serve principally to retain the small expansion (and, if provided, burnishing) rollers to the head. However, the large buffer rollers 88 and the buffer rollers 89 engaging the large burnishing rollers (not shown) as well as the small rollers 98 and 99 further transmit axial thrust from the burnishing rollers and from the largest expansion rollers to the head when the pipe is, after expansion, moved in the reverse direction over the expansion head. The longitudinally adjacent rollers, 93 and 97, and 94 and 98, being out of mutual engagement, are free to rotate in common directions.

The buffer rollers 87–90 and 93–99 are retained against radial outward displacement from the head by radially inwardly extending lugs 100 and 101 that have semi-circular recesses at their radially inner ends for engaging the journals 92. The lugs 100 and 101 are formed integrally with plates 102 or 103, respectively, the said plates having outward cylindrical surfaces conforming to the circular outline of the head and being secured thereto by recessed screws 104. Accordingly, each ring of buffer rollers is surrounded by a ring of plates 102 and 103, arranged circumferentially in alternation.

The expansion head has, further, a ring of guide or forming rollers 105, which may be but need not be circumferentially continuous. As is shown in FIGURES 6, 7, 9 and 12 four guide rollers 105 are provided, situated within recesses formed in the head and lying within a circle of diameter slightly less than that of the circle enclosing the first ring 49 of expansion rollers. The rollers 105 facilitate entry of the expansion head into the new pipe P and operate to form the pipe into approximately circular shape. This function is required when, as is frequently the case, the initial pipe sections P are not truly circular in cross section. The forming or guide rollers 105 may be secured to the head in any suitable manner, e.g., by securing frames 106 fastened to the expansion head by screws 107 and having radially inwardly extending lugs that engage journal pins projecting from the ends of the rollers 105. The rollers 105 first engage the new pipe and, if it is not initially circular, form it into approximately circular shape, suitable for the action of the ring 49 or of a subsequent ring of expansion rollers.

As appears in FIGURES 6, 7 and 8, resilient shields 108–111 are secured to the plates 102, 103. When burnishing rollers are provided, a resilient shield 112 is provided, being fastened to the rear end of the housing. The shields are secured to the expansion head by suitable hold-down means, such as screws 113 extending with threaded engagement into the plates 102, 103. These shields are in resilient wiping engagement with all pipe-engaging rollers, and prevent entry into the interior of the expansion head of scale from the pipe and of other foreign bodies. Further, these shields isolate the interior of the expansion head from the outside and make it possible to use the said interior space to contain a fluid at slightly superatmospheric pressure, e.g., a fluid having lubricating properties, which may be supplied to the expansion head through ducts (not shown) in the arbor 26.

For lubricating the expansion rollers 63, 64, of the several rings of expansion rollers (and, if desired, the burnishing rollers) there is provided, as appears in FIGURE 13, within each pipe-engaging roller (and, if desired, within each segment thereof, as shown) other than the lead rollers 105 a generally radial bore for admitting a lubricant under pressure. These bores are shown at 114, each bore having at its outer end a counterbore which is internally threaded and retains a closure plug 115. These plugs have outer surfaces that conform to the exterior curvatures of the respective rollers, and may have polygonal sockets formed therein. It will be understood that, when applying lubricant to the bearing needles 75–80, the plugs 115 are removed and a pressure fitting is connected to the counterbores, e.g., by their internal threads. After introduction of the lubricant, the plugs 115 are replaced, and are placed into orientations, angularly about their axes, to insure that their ends conform to the curvatures of the roller segments.

To reduce the escape of lubricant from the needle races, the several segments of each expansion (or burnishing) roller are preferably provided with intermediate seal means, such as rings 116 of plastic material, such as Teflon situated within circular grooves formed within semicircular cross sections in the axially directed end walls of the roller segments.

It will be understood that only the principal or unobvious parts of the apparatus were described, and that additional elements would be provided in practice. Also, the embodiments described are merely illustrative of the invention and subject to variations or substitutions of equivalents.

In operation, following the sequence noted above in connection with FIGURES 1–5, when the pipe P is forced axially over the head 25, the guide or forming rollers 105 position the new pipe coaxially to the head and, if the said pipe is not circular, form it into an approximately circular shape. The pipe next engages the circumferentially substantially continuous ring of expansion rollers of the ring 49, which further position the pipe and, if it has a diameter less than that of the outer surface of the ring 49, expands the pipe. This expansion, indicated in FIGURE 7, occurs about the complete circumference of the ring 49, to produce a pipe that is substantially free from longitudinal wrinkles or marks. Some elastic spring-back occurs after the pipe leaves the rollers of the ring 49. The ring 50, which may have an outer pipe-engaging diameter of about 0.2 to 0.8% larger than that of the ring 49, further expands the pipe uniformly about its full circumference. A similar relation and size relation exists between the rollers of the rings 51 and 50. The burnishing rollers 52, when provided, form a base limiting elastic spring-back after the expansion of the rollers 51, e.g., presenting an outer surface 0.06 to 0.6% less than that of the largest ring of expansion rollers.

By way of an example, to expand pipe to 36.000 inches, the diameters of the successive circles from front to rear may be: 35.280, 35.680, 36.100 and 36.000 inches (the last being a ring of burnishing rollers); these may be preceded by lead or guide rollers 105 situated within a circle of diameter 34.0 inches.

In the foregoing actions the buffer rollers 87–89 and 93–95 absorb the longitudinal thrust of the expansion rollers and transmit them to the head 25 and, through the latter, to the arbor 26 and stationary abutment 27. As previously noted, the outward thrust of these rollers is provided by the mandrel runways 57 and 58a, 58b, on which the radially inner faces of the several expansion and burnishing rollers bear.

After the pipe has been moved beyond the expansion head to the position of FIGURE 2, the burnishing rollers of the ring 52 center the expanded pipe in its return movement and facilitate re-entry of the pipe over the expansion head. It thereafter engages the largest expansion rollers of the ring 51 and is again expanded slightly, though principally elastically and for a small diametric distance. Due to the elevators 35, 35a, and the rollers 36, 37, the pipe P is rotated and returns in a position such that the longitudinal parts of the pipe that moved along the junctures of the small rollers 64 and the large rollers 63 during the forward, expansion movement, pass over continuous portions of the rollers. Thereby any irregularities or longitudinal marks along the said longitudinal parts are acted upon by continuous expanding surfaces and are smoothed out.

I claim as my invention:

1. The method of expanding pipe which comprises moving through said pipe an expansion head having expansion rollers while moving a mandrel through said head and pipe at a speed relative to the pipe which is twice that of the head, said expansion rollers being in substantial rolling engagement with said mandrel and with the inner surface of said pipe and turning on axes which are situated outwardly from and disposed substantially at right angles to the longitudinal axis of the mandrel, and transmitting from said mandrel an outward expanding thrust acting on the pipe.

2. The method as defined in claim 1 wherein said pipe is expanded simultaneously along a substantially continuous circle by a circular array of said expansion rollers.

3. The method of expanding pipe which comprises expanding the pipe simultaneously along a substantially continuous circle by moving through the pipe an expansion head having a ring of expansion rollers which are in substantial rolling engagement with the inner surface of the pipe throughout their lengths and turn on axes which are situated outwardly from and are disposed at right angles to the central longitudinal axis of the pipe, the outer surfaces of adjacent expansion rollers being juxtaposed to provide a substantially continuous outer expansion surface.

4. The method as defined in claim 3 wherein said pipe is expanded simultaneously along axially displaced, substantially circular expansion zones by a series of rings of expansion rollers displaced axially along the axis of the head, the expansion rollers of each ring having larger diameters than those of the ring toward the leading end of the head.

5. The method as defined in claim 1 wherein the relative movements of the pipe, expansion head and mandrel are effected by moving said pipe to an initial position in substantial axial alignment with said mandrel and head, maintaining said head is a substantially stationary position, and simultaneously pushing the pipe axially toward the stationary head and mandrel and pushing the mandrel toward the pipe.

6. An expansion head for expanding pipe, comprising a housing adapted for movement through the pipe, a circumferential ring of expansion rollers mounted on said housing for rotation on axes which are situated outwardly from the central longitudinal axis of the housing and are disposed substantially at right angles to said axis, successive rollers having different diameters and each roller having a convex outer surface which is shaped in conformity to the inner surface of the pipe after expansion for engaging said surface substantially along the full length of the roller and adjacent rollers having their outer surfaces juxtaposed at the sides away from said central axis, whereby the ring of rollers provides a substantially continuous outer expanding surface for engaging the pipe along a substantially continuous expansion zone, and means for opposing movement of said expansion rollers inwardly toward said central axis and thereby maintain the rollers in engagement with said pipe surface.

7. An expansion head as defined in claim 3 wherein said housing includes a plurality of rings of expansion rollers, each constructed as defined, said rings being relatively displaced along said axis of the head and the outer expanding surface of one ring having a diameter which is greater than the diameter of the outer expanding surface of another ring, whereby said pipe can be expanded in steps.

8. An expansion head as defined in claim 6 wherein at least some of said expansion rollers comprise a plurality of sections of different diameters which are displaced along the roller axis and are independently rotatable, each section including means for constraining the sections thereof to rotate about a common axis.

9. An expansion head as defined in claim 6 wherein each of said expansion rollers is provided with journal means, the axes of rotation of rollers of different diameters being situated at different distances from said central axis and the axes of rotation of adjacent rollers being angularly related, each larger-diameter being recessed at each end thereof which adjoins a smaller-diameter roller and the latter being nested partly within the recessed end of the adjacent larger-diameter roller.

10. An expansion head as defined in claim 9 wherein each of said recesses contains, at least in part, a support block that is connected to the journal means of the recessed roller and to the journal means of the adjoining roller, whereby said support blocks are constrained against rotation by the angular relation of said journal means.

11. An expansion head as defined in claim 9 wherein each journal means is connected non-rotatably to the journal means of adjacent expansion rollers, whereby the several journal means of the expansion rollers form a continuous supporting frame.

12. An expansion head as defined in claim 9 wherein one roller of said ring is formed, at least in part, of a plurality of separate segments each including a part of the peripheral surface of the roller, said roller including means rigidly interconnecting said segments.

13. An expansion head as defined in claim 22 wherein each of said roller segments has an abutment face shaped for abutment with the corresponding face of another roller segment, each said face having a recess and a projection shaped to fit engagingly into the recess of the abutment face of another segment.

14. In combination with the expansion head defined in claim 6, wherein said expansion rollers are arranged as one or more rings of rollers extending about the head, a ring of shaping rollers journalled on the head in front of said expansion rollers and situated within a circle having a diameter smaller than the internal diameter of the pipe to be expanded and smaller than the diameter of the circle enclosing the outer surfaces of said ring of expansion rollers, for first entering the pipe and shaping the pipe into an approximately circular shape.

15. In combination with the expansion head defined in claim 6, wherein said expansion rollers are arranged as one or more rings of rollers extending about the head, a ring of burnishing rollers extending about the head and situated in rear of the said expansion rollers, said burnishing rollers having convex outer surfaces lying in a circle having a diameter smaller than the external diameter of the largest ring of expansion rollers, said circle which defines the burnishing rollers being of diameter substantially equal to that of the expanded pipe for engaging the internal surface of said pipe and limit elastic spring-back, and to facilitate re-entry of the head into the pipe when the pipe is stripped from said head.

16. An expansion head for expanding pipe, comprising a housing having a longitudinal passage along the central axis thereof shaped to receive a mandrel, a mandrel that extends through said passage and is axially movable relatively to the head, and a plurality of expansion rollers having convex outer surfaces mounted in said head for rotation on axes which are situated outwardly from and disposed substantially at right angles to the longitudinal axis of the mandrel, said rollers being positioned to engage simultaneously said mandrel and the inner surface of a pipe to be expanded, said head providing openings for engagement of said expansion rollers simultaneously with said mandrel and inner pipe surface.

17. An expansion head as defined in claim 16 wherein said expansion rollers are arranged as a ring of rollers about the head and said head includes a series of rings of expansion rollers displaced along the longitudinal axis of the head, the expansion rollers in successive rings being in longitudinal alignment with each other and having progressively greater diameters, whereby said pipe can be expanded in steps.

18. An expansion head for expanding pipe, comprising a housing having a longitudinal passage along the central axis thereof shaped to receive a relatively axially movable mandrel, and a plurality of expansion rollers having convex outer surfaces mounted on said head for rotation on axes which are situated outwardly from the longitudinal axis of the head and disposed substantially at right angles to said axis, said rollers being positioned to engage simultaneously said mandrel when the mandrel extends through said passage and the inner surface of a pipe to be expanded, said head providing openings for engagement of said expansion rollers simultaneously with said mandrel and surface, said expansion rollers including a circumferential ring of rollers of different diameters having axes of rotation at different distances from the central axis of the head, each said expansion roller being shaped in conformity to the said inner surface of the pipe after expansion for engaging the pipe substantially along the full length of the roller and adjacent rollers in said ring having their outer surfaces juxtaposed at the sides away from said central axis whereby said ring of rollers provides a substantially continuous outer expanding surface for engaging the pipe along a substantially continuous expansion zone.

19. An expansion head as defined in claim 16 wherein each of said expansion rollers comprises a plurality of relatively rotatable sections of different diameters displaced along the respective axis of rotation, each sectioned roller including means for constraining the sections thereof to rotate about a common axis.

20. An expansion head for expanding pipe, comprising a housing having a longitudinal passage along the central axis thereof shaped to receive a relatively axially movable mandrel, and a plurality of expansion rollers mounted on said head for rotation, said rollers being positioned to engage simultaneously said mandrel when the mandrel extends through said passage and the inner surface of a pipe to be expanded, said head providing openings for engagement of said expansion rollers simultaneously with said mandrel and surface, said expansion rollers being arranged as a ring of rollers having their axes of rotation situated substantially in a plane perpendicular to the central longitudinal axis of the head and the axis of rotation of each roller being angularly related to those of rollers adjacent thereto, said ring including a first set of large-diameter expansion rollers and a second set of small-diameter expansion rollers mounted in alternation with those of the first set, the axes of rotation of the second set being farther from said central axis than those of the first set, each of said rollers having a substantially arcuate outline that conforms to the substantially circular inner surface of the pipe after expansion for engaging the pipe substantially along the full length of the roller, and the outer surfaces of said rollers being closely juxtaposed at the side away from said central axis to provide a substantially continuous outer expanding surface.

21. An expansion head as defined in claim 19 wherein each of said expansion rollers is provided with journal means therefor, each large-diameter roller is recessed at both ends thereof radially inwards from the outer surface thereof, and each said recess contains at least in part a support block that is connected to the journal means of both a large-diameter and a small-diameter roller, whereby said support blocks are constrained against rotation by the angular relation of said journal means.

22. An expansion head as defined in claim 20 wherein one of the journal means connected to each support block is a journal pin that is rotatably mounted within an expansion roller and has at an end an integral extension which is eccentric to the axis of rotation of said roller and pivotally mounted on said block, whereby rotation of said journal pin relatively to the block is prevented by the eccentricity of said extension.

23. An expansion head for expanding pipe, comprising in combination a housing having a longitudinal passage along the central axis thereof shaped to receive a relatively axially movable mandrel, a plurality of expansion rollers having convex outer surfaces mounted on said head for rotation, said rollers being positioned to engage simultaneously said mandrel when the mandrel extends through said passage and the inner surface of a pipe to be expanded, said head providing openings for engagement of said expansion rollers simultaneously with said mandrel and surface, and a buffer roller journalled to said housing and situated in rear of and in rolling engagement with each expansion roller, said buffer roller having a diameter less than that of the expansion roller engaged thereby.

24. The combination defined in claim 23 wherein each said expansion roller is in rolling engagement with a pair of buffer rollers which are situated, respectively, in front of and in rear of the expansion roller, said buffer rollers being mounted for rotation on axes more distant from the central axis of the head than the axes of rotation of the expansion rollers engaged thereby, thereby retaining the expansion rollers against outward displacement from the head.

25. The combination defined in claim 23 wherein said head includes a plurality of axially spaced rings of expansion rollers, each said ring including expansion rollers of relatively larger and smaller diameters and said buffer rollers including a set of large-diameter buffer rollers each of which, except those at the ends of the series of rings, is in rolling engagement with a pair of larger-diameter expansion rollers, and a set of small-diameter buffer rollers each of which is in rolling engagement with only one smaller-diameter expansion roller.

26. In combination with the expansion head defined in claim 23, circumferential retaining bands extending about the head peripherally outside of the buffer rollers and providing abutment means for securing said buffer rollers against outward displacement from the head.

27. In combination with the expansion head as defined in claim 13, resilient shield means secured externally to said head and covering said expansion rollers in part and being in wiping engagement with said expansion rollers.

28. An expansion head for expanding pipe, comprising a housing having a longitudinal passage along the central axis thereof shaped to receive a relatively axially movable mandrel, and a plurality of expansion rollers having convex outer surfaces mounted on said head for rotation, said rollers being positioned to engage simultaneously said mandrel when the mandrel extends through said passage and the inner surface of a pipe to be expanded, said head including a plurality of sector-shaped parts each extending the full length of the head and conjoined along radial planes passing through the central longitudinal axis of the head and providing openings for engagement of said expansion rollers simultaneously with said mandrel and surface of the pipe.

29. In combination with the expansion head defined in claim 15, wherein said sector-shaped parts have projections that extend radially inwards, a mandrel that is axially slidable and extends through said head, said mandrel providing longitudinal grooves within which said projections are situated.

30. The combination defined in claim 28 wherein at least one wall of each said groove in the mandrel is inclined to the radial plane passing through the mandrel axis in a direction locking said projection within the groove, whereby said sectors are prevented from radially outward movement from the mandrel.

31. Apparatus for expanding pipe, comprising:
 (a) an expansion head having a housing with a passage extending along the central longitudinal axis thereof,
 (b) a mandrel situated within said passage and longitudinally slidable therein, said mandrel providing longitudinally extended rolling surfaces, and
 (c) a plurality of expansion rollers having convex outer surfaces and axes of rotation situated generally in a plane transverse to said axis mounted in said housing,
 (d) said rollers being in substantial rolling engagement with said surfaces of the mandrel and having their outer surfaces exposed for substantially rolling engagement with the inner surface of the pipe to be expanded.

32. Apparatus as defined in claim 30, wherein said expansion rollers include large-diameter rollers and small-diameter rollers, and said mandrel provides rolling surfaces situated at different radial distances from the central axis of the mandrel for engagement respectively with said large-diameter and small-diameter rollers when all of said rollers are in engagement with the inner surface of the pipe.

33. Apparatus as defined in claim 30 wherein said expansion rollers have arcuate outlines for engaging said pipe surface substantially along the full lengths of the rollers and said rolling surfaces on the mandrel are of complementary concave shapes in the plane perpendicular to the mandrel axis for substantially rolling engagement with said expansion rollers.

34. Apparatus as defined in claim 30 wherein said expansion rollers are arranged in one or more rings about the head and said ring includes large-diameter and small-diameter rollers, each roller having a substantially arcuate outline for engaging said pipe surface substantially along the full length of the roller, said rollers having their outer surfaces juxtaposed in close proximity and thereby providing a substantially continuous outer expanding surface for engagement with the said pipe surface, said mandrel providing rolling surfaces situated at different radial distances from the central axis of the mandrel for engagement respectively with said large-diameter and small-diameter rollers when all of said rollers are in engagement with the said pipe surface, each of said rolling surfaces on the mandrel being concave in cross section and having a radius of curvature conforming substantially to that of the expanded pipe for predominantly rolling engagement with said expansion rollers.

35. Apparatus as defined in claim 30 wherein said mandrel comprises a longitudinal tube and a plurality of longitudinally elongated sectors secured to the outside of said tube and shaped to provide the said rolling surfaces.

36. In combination with the apparatus defined in claim 30, an annular arbor secured to said expansion head having an external diameter less than the expanded internal pipe diameter, said mandrel extending through said arbor, and means for forcing said pipe and mandrel in approaching axial directions for moving the pipe over said expansion head.

37. In combination with the apparatus defined in claim 35, roller conveyor means for positioning the pipe to be expanded in subtsantially axial alignment with said head and mandrel and moving said pipe toward the head, and means for maintaining said arbor in axially stationary position, said means for forcing the pipe and mandrel including a first axially movable abutment positioned to engage the end of the pipe on said conveyor means which is remote from the expansion head, a second axially movable abutment supportingly engaged to the end of the mandrel which is remote from said pipe, and means for moving said abutments toward each other at the same rates of movement relatively to the arbor.

38. In combination with the apparatus defined in claim 36, means for moving said pipe onto the said expansion head and over it, and simultaneously pulling the mandrel in the opposite direction.

39. In combination with the apparatus defined in claim 30,
(a) means for moving said pipe axially relatively to said expansion head throughout the full length of said pipe,
(b) means for rotating the expanded pipe after movement about said head through a small angle about its axis, and
(c) means for moving said pipe in altered angular position relatively to said expansion head onto the expansion head and beyond the front end of said head.

40. The combination defined in claim 39 which includes on said head in rear of the expansion rollers a circle of burnishing rollers situated within a circle smaller than the adjacent circle of expansion rollers for facilitating reentry of the expansion head into the expanded pipe during movement thereof toward the head of said head.

41. In a pipe-expanding head which includes a ring of convexly shaped expansion rollers that are terminally juxtaposed at their outer surfaces to provide a substantially continuous outer expanding surface adapted to engage the inner surface of a pipe, a roller construction for assembling the last roller in said ring of rollers, comprising:
(a) a journal-supporting member situated at least partly within recesses at the ends of rollers at both ends of said last roller,
(b) said last roller comprising three sections displaced along the axis of rotation thereof and at least one of said sections other than an end section being formed of a plurality of segments each providing a part of the convex peripheral surface thereof, and
(c) a journal pin for said last roller comprising three axially juxtaposed sections of which
(1) the end sections are secured at their outer ends to said journal-supporting members and the end sections of the roller are journalled prediminantly on said section of the journal pin, and
(2) the intermediate section of the pin is fitted to the inner ends of said end pin sections and the central roller section is journalled predominantly thereon.

References Cited
UNITED STATES PATENTS

| | | | |
|---|---|---|---|
| 331,570 | 12/1885 | Tasker | 72—113 |
| 375,352 | 12/1887 | Handloser | 29—125 |
| 698,404 | 4/1902 | Knapp | 72—393 |
| 1,016,587 | 2/1912 | Swartzlander | 72—113 |
| 1,067,115 | 7/1913 | Hufford | 72—393 |
| 2,164,574 | 7/1939 | Christman | 29—90 |
| 2,780,271 | 2/1957 | Ewart et al. | 72—342 |
| 2,898,971 | 8/1959 | Hempel | 72—342 |
| 3,188,850 | 6/1965 | Linthicum et al. | 72—393 |

CHARLES W. LANHAM, *Primary Examiner.*